Patented Feb. 9, 1943

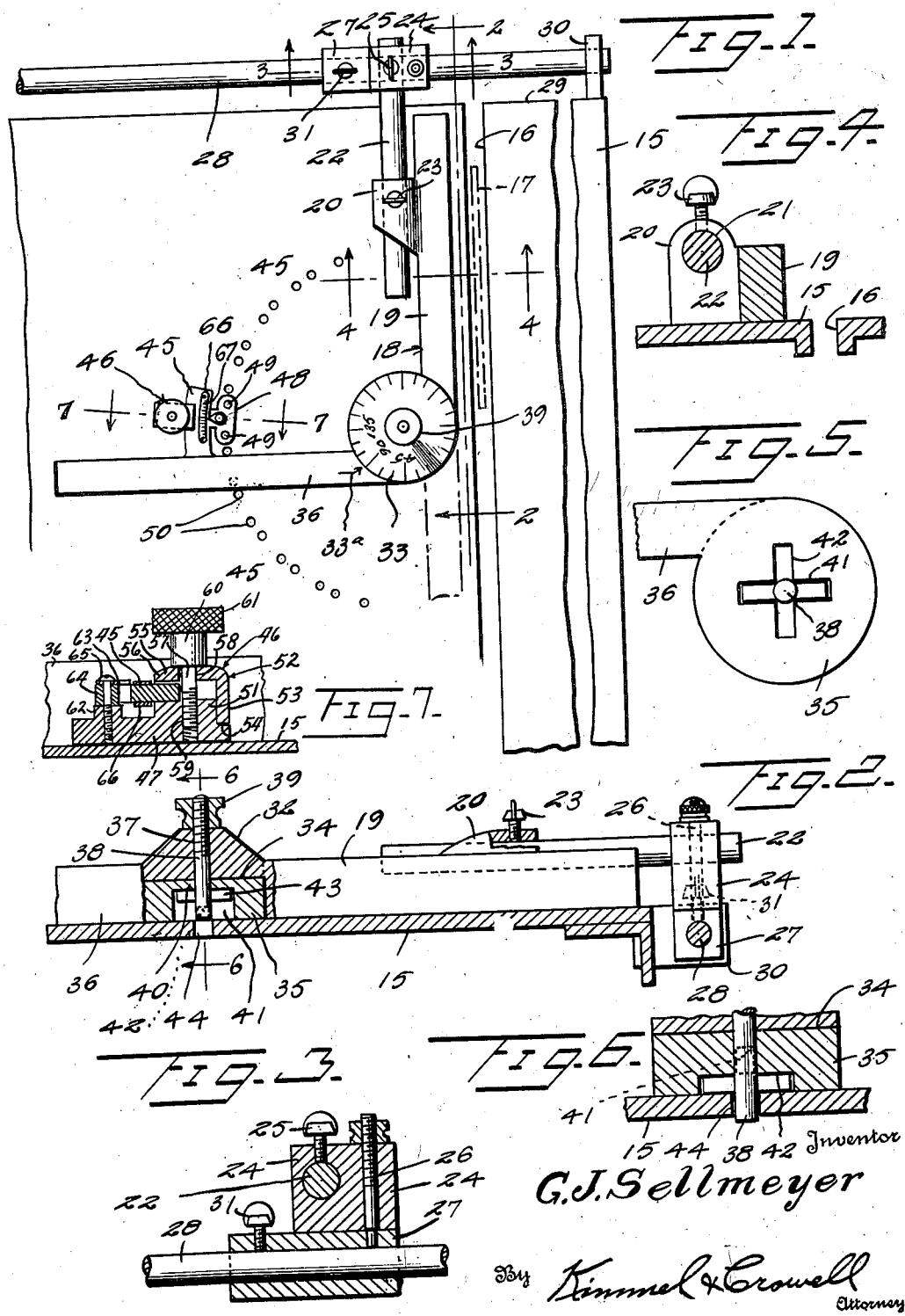

2,310,813

UNITED STATES PATENT OFFICE 2,310,813

WORK GUIDE FOR SAW TABLES

Gilbert J. Sellmeyer, Indianapolis, Ind.

Application December 6, 1940, Serial No. 368,928

6 Claims. (Cl. 143—169)

This invention relates to work guides or fences for saw tables and is an improvement over the work guide structure embodied in my copending application, Serial Number 329,776, filed April 15, 1940.

An object of this invention is to provide an improved work guide for a saw table which may be shifted transversely of the table and readily secured in adjusted position.

Another object of this invention is to provide a work guide or fence which is so constructed that a portion thereof may be angularly adjusted with respect to the remainder of the guide, the guide also including means whereby it may be firmly secured relative to the saw table so as to thereby prevent shifting or bending of the guides relative to the table during the use thereof.

A further object of this invention is to provide a work guide of this kind which is constructed in the form of a protractor having one portion thereof angularly adjustable relative to the other portion and also provided with means whereby the angularly adjusted portion may be anchored or locked against movement relative to the table.

A further object of this invention is to provide a work guide of this kind which can be shifted to different positions with respect to the saw table and locked in its shifted or adjusted position.

A further object of this invention is to provide a work guide of this kind in the form of a protractor with a vernier calibration by means of which the adjustable portion of the guide may be finely adjusted to the desired angle and then locked or clamped in its finely adjusted position.

To the foregoing objects and to others which may hereinafter appear, the invention consists of the novel construction, combination and arrangement of parts as will be more specifically referred to and illustrated in the accompanying drawing wherein are shown embodiments of the invention, but it is to be understood that changes, variations and modifications may be resorted to which fall within the scope of the invention as claimed.

In the drawing:

Figure 1 is a fragmentary top plan of a saw table having a work guide or fence constructed according to an embodiment of this invention mounted thereon.

Figure 2 is a fragmentary sectional view taken on the line 2—2 of Figure 1.

Figure 3 is a fragmentary sectional view taken on the line 3—3 of Figure 1.

Figure 4 is a fragmentary sectional view taken on the line 4—4 of Figure 1.

Figure 5 is a fragmentary bottom plan of the inner end portion of the angularly adjustable guide or fence.

Figure 6 is a vertical section taken substantially on the line 6—6 of Figure 2, and Figure 7 is an enlarged fragmentary sectional view taken on the line 7—7 of Figure 1.

Referring to the drawing the numeral 15 designates generally a saw table which is provided with a saw slot 16 extending lengthwise of the table 15 and in which a saw 17 is adapted to be moved. The saw 17 is movable lengthwise of the slot 16, the mounting means by which the saw 17 may be moved longitudinally of the slot 16 being embodied in my copending application hereinbefore mentioned.

A combined work guide and protractor device generally designated as 18 is mounted for adjustable positioning on top of the saw table 15 and for adjustment relative to the slot 16. The work guide 18 comprises a rear guide bar 19 which may be substantially rectangular in transverse section and which is adapted to have the lower face thereof contact with the upper face of the saw table 15. The work guide member 19 on the side thereof opposite from the side confronting the slot 16 is provided with a laterally extending boss 20 having an opening 21 in which a guide supporting bar 22 is adapted to engage. The boss 20 is adapted to be adjusted lengthwise of the bar 22 by means of a set screw 23, which is threaded through the boss 20.

The rear end of the supporting bar 22 is mounted in a block 24 being secured therein by means of a set screw 25. The block 24 is secured by means of a fastening device 26 to a slide member or block 27 which is slidable on a guide bar 28. The guide bar 28 is disposed in rearwardly spaced relation to the rear edge 29 of the saw table 15, being supported in rearwardly spaced relation by means of a pair of ears or lugs 30 which are carried by the opposite sides of the table 15 adjacent the rear thereof. The slide member 27 may be adjusted lengthwise of the guide bar 28 by means of a set screw 31.

The rear guide or fence member 19 at its forward end is provided with a frusto-conical plate 32 having graduations 33 adjacent the base thereof. The bottom face 34 of the frusto-conical plate 32 is upwardly offset from the lower face of the rear guide member 19 and a disc-shaped plate 35, which is fixed to a forward or adjustable gide or fence 36, is engageable in the recess formed by the upward offset of the bottom face of the plate 32. The plate 32 has an axial bore 37 therethrough in which a locking bolt 38 is engageable. A thumb nut 39 is threaded on the upper end of the bolt 38 and the bolt 38 at its lower end portion extends through an opening 40 which is provided axially of the disc-shaped plate 35. The plate 35 is provided with a pair of right angularly disposed slots 41 and 42 in a selected one of which a transversely disposed pin 43, which is carried by the bolt 38, is adapted to engage.

The pin 43 provides a means whereby the lower end of the bolt 38 may be extended downwardly below the plate 35 into an opening 44, which is provided in the table 15. The bolt 38 when the lower end thereof is extended below the plate 38 will have the transverse pin 43 engaging in the slot 42. When the pin 43 engages in the slot 41, the lower end of the bolt 38 will be substantially flush with the bottom surface of the plate 35.

In order to provide a means whereby the forward guide or fence member 36 may be securely locked in its angularly adjusted position relative of the rear guide or fence member 19, I have provided an arcuate arm 45 which is fixed to the guide or fence member 36 and extends laterally thereof over the table 15.

A clamping member generally designated as 46 is adapted to engage the arm 45 and also the table 15 so as to firmly lock the guide member 36 in its angularly adjusted position. The clamping member 46 comprises a base block 47 which is provided with a right angularly disposed end portion 48 in which a pair of spaced apart pins 49 are mounted. The pins 49 project downwardly below the lower surface of the right angularly disposed block member 48 and are adapted to engage in selected pairs of holes 50 which are formed in the table 15. The holes 50 are inscribed on an arc which has as its axis the center of the hole 44. The block 47 is provided with an upwardly offset part 51 against which the lower face of the arm 45 is adapted to slidably engage. The arm 45 is firmly secured or locked relative to the block 47 by means of an L-shaped clamping member 52. The clamping member 52 has one leg 53 thereof engaging a shoulder 54 which is formed in the block 47 and the other or upper leg 55 extends horizontally over the upper surface of the arm 45 and is provided with a downturned forward end 56 which is engageable with the upper surface of the arm 45.

A thumb bolt including a stem 57 which is extended through an opening 58 formed in the upper leg 55 and threaded as at 59 into the block 47 provides a means whereby the clamping member 52 may firmly hold the arm 45 against movement relative to the block 47. The bolt 57 is provided with a head or shank 60 engageable with the upper surface of the leg 55 and a knurled knob 61 is carried by the head or shank 60.

The block 47 is provided with an upwardly extending boss 62 which is spaced from the boss or seat 51. A pointer 63 is supported above the boss 62 by means of a cylindrical spacing member 64 and preferably a bolt or screw 65 extends downwardly through the pointer 63 and the spacer 64 and is threaded into the boss 62 and the block 47.

The arm 45 on the upper and lower faces thereof has a pair of arcuate plates 66 which are provided with graduations 67, the graduations 67 being vernier graduations by means of which the adjustable guide member may be very finely adjusted in its angled position with respect to the guide or fence 19.

In the use and operation of this work guide, the guide member including the rear member 19 and the forward member 36 may if desired be disposed in alignment with each other so as to provide a straight guide or fence on one side of the saw slot 16. In this position, the guide member 36 will be in the position shown by the dot and dash lines in Figure 1.

However, if it is desired to make a transverse cut in a piece of work, the work may be held in the desired angular position by angularly adjusting the forward fence or guide member 36. This may be done by loosening the nut 39 and lowering the bolt 38 until the transverse pin 43 engages in the lower slot 42. In this position, the bolt 38 will engage in the hole 44 of the table 15. When the guide member 36 is shifted or angularly adjusted relative to the guide member 19, the nut 39 may be tightened and the clamping member 46 may then be disposed with the pins 49 thereof engaging in the selected pair of holes 50 in the table 15.

The clamping member 52 may then be tightened so as to tightly clamp the arcuate arm 45 to the block 47. In view of the fact that the inner end portion of the fence or guide 36 is securely locked against movement by engagement of the pin 38 in the hole 44 and the outer portion of the guide or fence 36 is locked by the arm clamping means 46, the fence or guide 36 will be firmly held against movement relative to the table 71. The angular position of the guide member 36 relative to the guide member 19 may be initially determined by a pointer 33ª which is carried by the guide member 36.

In the event a very fine adjustment is to be made of the guide member 36, the nut 39 may be loosened slightly and the arm 45 adjusted relative to the pointer 63.

A work guide or fence structure constructed according to this invention is exceedingly simple in construction and readily adjustable with respect to the saw table.

What I claim is:

1. In combination, a saw table provided with a saw slot, and an opening at one side of said slot, a pair of guide members, a boss carried by one of said members, a bar engaging in said boss, means securing said bar in said boss, means carried partly by said table and partly by said bar for holding said bar in adjusted position relative to said slot, an annular plate secured to the forward end of said member, a second annular plate secured to the other member, each of said plates having an axial opening therethrough and said second plate having a pair of right angularly disposed downwardly facing slots with one slot substantially deeper than the other slot, a plate clamping bolt engaging through said axial openings, and a pin extending transversely through said bolt, said pin when disposed in the shallower of said slots holding the bolt in a position with the lower end thereof projecting below the second plate for engagement in said first opening.

2. In combination, a saw table provided with a saw slot, an opening at one side of said slot and an arcuate series of holes concentric to said opening, a pair of guide members, a boss carried by one of said members, a bar engaging in said boss, means securing said bar in said boss, means carried partly by said table and partly by said bar for holding said bar in adjusted position relative to said slot, an annular plate secured to the forward end of said member, a second annular plate secured to the other member, each of said plates having an axial opening therethrough and said second plate having a pair of right angularly disposed downwardly facing slots with one slot substantially deeper than the other slot, a plate clamping bolt engaging through said axial openings, a pin extending transversely through said bolt, said pin when disposed in the shallower of said slots holding the bolt in a position with the lower end thereof projecting below the second plate for engagement in said first opening, and means engageable with said other guide member and with selected holes in said table for locking said other guide member against movement relative to the table.

3. In combination, a saw table provided with a saw slot and an opening at one side of said slot, a pair of guide members, a boss carried by one of said guide members, said boss being offset from said guide member, and having an opening extending therethrough substantially parallel to said latter named guide member, a bar engaging in said boss, means securing said bar in said boss, means carried by said table and partly by said bar for holding said bar in adjusted position relative to said slot, an annular plate carried by the forward end of said member, a second annular plate carried by the other member, each of said plates having an axial opening therethrough, and said second plate having a pair of right angularly disposed downwardly facing slots with one slot substantially deeper than the other slot, a plate clamping bolt engaging through said axial openings and a pin extending transversely through said bolt, said pin when disposed in the shallower of said slots holding the bolt in a position with the lower end thereof projecting below the second plate for engagement in said first opening, said plates and said bolt coacting to provide a pivot for said guide members.

4. In combination, a saw table provided with a saw slot and an opening at one side of said slot, a pair of guide members, means carried by by said table for supporting one of said guide members in position on said table, an annular plate formed integrally on the end of one of said members, a second annular plate formed integrally with one end of the other of said members, each of said plates having an axial opening therethrough and said second named plate having a pair of right angularly disposed downwardly facing slots with one slot substantially deeper than the other slot, a plate clamping bolt engaging through said axial openings and a pin extending transversely through said bolt, said pin when disposed in the shallower of said slots holding the bolt in a position with the lower end thereof projecting below the second plate for engagement in said opening, said plates and said bolt coacting to provide a pivot for said guide members.

5. In combination a saw table provided with a saw slot and an opening at one side of said slot, a work guide structure engageable on the upper surface of said table, and means engaging one end of said structure for supporting said one end from said table, said structure comprising a pair of elongated guide members and means pivotally securing said members together, one of said members having a pair of right angularly disposed downwardly opening slots therein with one slot deeper than the other, said pivotal means including a right angular pin engageable in a selected slot, engagement of said pin in the shallower of said slots, disposing said pivotal means partly below said one member for engagement in said table opening.

6. In combination a saw table provided with a saw slot and an opening at one side of said slot, a work guide structure engageable on the upper surface of said table, and means engaging one end of said structure for supporting said one end from said table, said structure comprising a pair of elongated guide members and means pivotally securing said members together, one of said members having a pair of right angularly disposed downwardly opening slots therein with one slot deeper than the other, said pivotal means including a straight bolt and a pin extending through said bolt intermediate the ends thereof whereby engagement of said pin in the shallower of said slots will dispose said pivotal means partly below said one member for engagement in said table opening.

GILBERT J. SELLMEYER.